United States Patent
Kim (10) Patent No.: US 6,966,713 B2
(45) Date of Patent: Nov. 22, 2005

(54) PRINT MEDIA EDGE DETECTION METHOD AND APPARATUS

(75) Inventor: Tae-young Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/891,284

(22) Filed: Jul. 15, 2004

(65) Prior Publication Data

US 2005/0013644 A1    Jan. 20, 2005

(30) Foreign Application Priority Data

Jul. 15, 2003    (KR) ............... 10-2003-0048430

(51) Int. Cl.⁷ ............... B41J 5/30; B41J 11/44; B41J 29/18; B41J 29/393
(52) U.S. Cl. ............... 400/76; 400/61; 400/708; 347/19
(58) Field of Search ............... 400/76, 61, 708, 400/611, 279; 347/19, 16, 41, 104, 105, 106

(56) References Cited

U.S. PATENT DOCUMENTS

| | | | |
|---|---|---|---|
| 4,960,336 A * | 10/1990 | Brooks et al. ............... 400/61 |
| 5,255,987 A * | 10/1993 | Mizuno et al. ............... 400/61 |
| 5,466,079 A | 11/1995 | Quintana ............... 400/579 |
| 5,564,848 A | 10/1996 | Quintana ............... 400/708 |
| 5,610,721 A * | 3/1997 | Higuchi et al. ............... 358/296 |
| 5,618,120 A * | 4/1997 | Ishikawa ............... 400/708 |
| 5,718,057 A | 2/1998 | Rösli et al. ............... 33/617 |
| 5,796,083 A * | 8/1998 | Kenneth et al. ............... 235/380 |
| 6,000,693 A | 12/1999 | Tranquilla ............... 271/263 |
| 6,079,892 A | 6/2000 | Yamaguchi et al. ............... 400/708 |
| 6,257,569 B1 * | 7/2001 | Rhodes et al. ............... 271/117 |
| 6,302,510 B1 * | 10/2001 | Yoshida ............... 347/19 |
| 6,305,856 B1 * | 10/2001 | Miyazaki ............... 400/279 |
| 6,348,697 B1 * | 2/2002 | Kitajima ............... 250/559.4 |
| 6,352,332 B1 | 3/2002 | Walker ............... 347/19 |
| 6,394,676 B1 * | 5/2002 | Dresher ............... 400/703 |
| 6,637,852 B2 * | 10/2003 | Bjune ............... 347/16 |

FOREIGN PATENT DOCUMENTS

| | | |
|---|---|---|
| EP | 0 930 259 A1 | 7/1999 |
| JP | 60-161183 | 8/1985 |
| JP | 0-382-502 | 8/1990 |
| JP | 2-198952 | 8/1990 |
| JP | 4-363277 | 12/1992 |

OTHER PUBLICATIONS

Patent Abstract of Japanese Publication No. 59225980 (Dec. 19, 1984).

* cited by examiner

Primary Examiner—Andrew H. Hirshfeld
Assistant Examiner—Wasseem H. Hamdan
(74) Attorney, Agent, or Firm—Staas & Halsey LLP (57) ABSTRACT

A print media edge detection method including: generating reference data by scanning an edge zone of a sheet of print media using an optical sensor and detecting the amount of reflected light; if the edge zone of the sheet lies in a sensing zone of the optical sensor, calculating measuring data by scanning the edge zone and detecting the amount of reflected light; checking a voltage range of the edge zone from the measuring data, calculating a most frequently appearing voltage value within the voltage range, and setting the most frequently appearing voltage value as an edge position voltage value; and setting a position of the sheet corresponding to the edge position voltage value in the reference data as an edge position. Since the edge position is exactly detected, a printing error of the edge position decreases.

16 Claims, 6 Drawing Sheets

PRINT MEDIA EDGE DETECTION METHOD AND APPARATUS

CROSS-REFERENCE TO RELATED APPLICATION

This application claims the priority of Korean Patent Application No. 2003-48430, filed on Jul. 15, 2003, in the Korean Intellectual Property Office, the disclosure of which is incorporated herein in its entirety by reference.

BACKGROUND OF THE INVENTION

1. Field of the Invention

The present invention relates to print media edge detection, and more particularly, to a print media edge detection method and apparatus capable of performing marginless edge printing by improving edge detection ability.

2. Description of the Related Art

When marginless printing on a top, bottom, right, or left edge position of a print medium is performed in a hard copy apparatus, edge printing may not be performed on an exact position due to failure of an exact edge position detection. As an example, when printing on the bottom edge position is performed, a jump effect may occur, by which a sheet of print media transported into a printing zone by feeding rollers is transported farther than a print media set distance due to a print media escape speed when the sheet of print media is freed from the feeding rollers. The jump effect occurs since the sheet of the print media out from the feeding rollers cannot be strongly held only with discharging rollers. As such, printing quality may be deteriorated due to the occurrence of a feeding error caused by the jump effect.

To resolve this problem, conventional print media edge detection methods are disclosed in U.S. Pat. Nos. 6,352,332 and 6,079,892.

Figure 1:
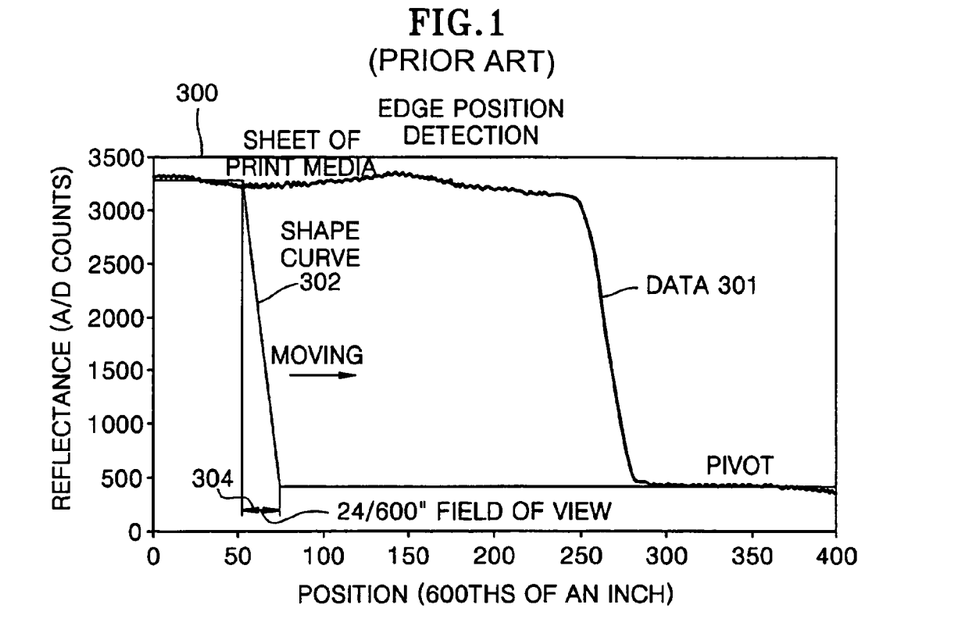
FIGS. 1 and 2 are graphs to explain a print media edge detection method disclosed in U.S. Pat. No. 6,352,332.
Figure 2:
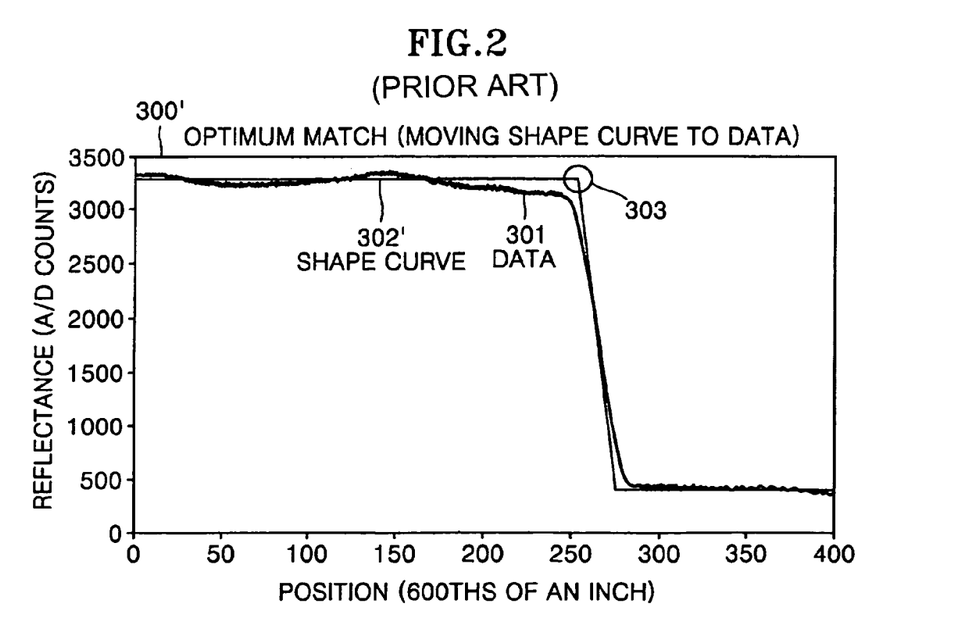

FIGS. 1 and 2 are graphs to explain a print media edge detection method disclosed in U.S. Pat. No. 6,352,332.

With reference to FIG. 1, measured reflectance data 301 according to a position is obtained by scanning a front surface of a sheet of print media using an optical sensor to detect an edge position of the sheet of print media. With reference to the data 301, the reflectance is about 3,300 A/D counts on most of the sheet of print media, gradually decreases near from the edge position of the sheet of print media, dramatically decreases outside of the edge position of the sheet of print media, and is about 490 A/D counts on a pivot. A shape curve 302 in accordance with Equation 1 is formed by calculating a high average reflectance and a low average reflectance from a plurality of sample data and considering a field of view of the optical sensor.

$$\text{slope} = (\text{high average reflectance} - \text{low average reflectance}).\text{div.field of view}. \quad \text{Equation 1}$$

If the shape curve 302 is moved in an arrow mark direction with a distance corresponding to a predetermined error value to find out a real edge position using a reference edge position, a graph 300' with a moved shape curve 302' can be obtained as shown in FIG. 2. With reference to FIG. 2, in the conventional method, a position corresponding to an edge 303 when the reflectance suddenly decreases, that is, 250 (*1/600 inch) is set as the edge position.

However, in the print media edge detection method disclosed in U.S. Pat. No. 6,352,332, when the shape curve 302' is formed, a slope start position is not accurate, and a position variation range of the edge 303 can be wide.

Figure 3:
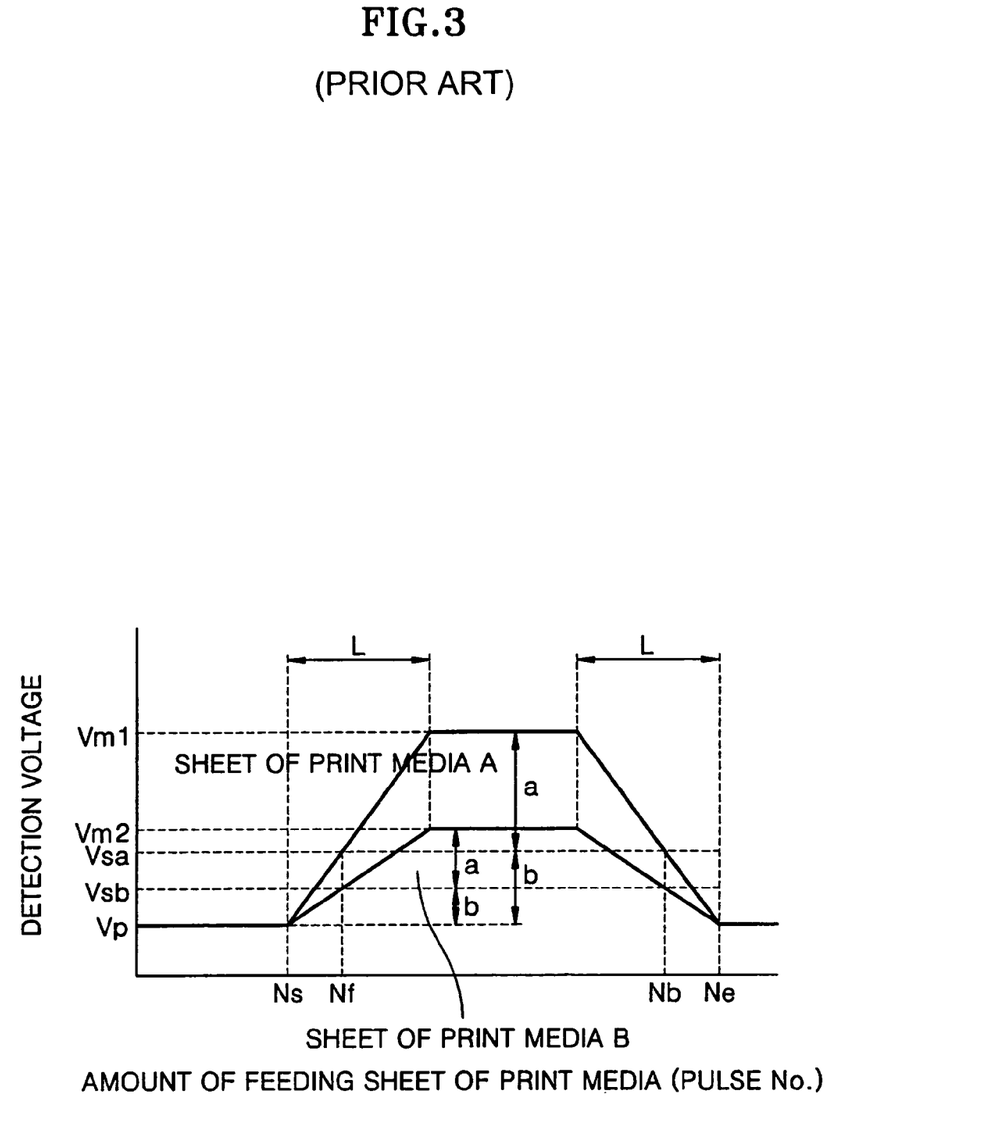
FIG. 3 is a graph to explain a print media edge detection method disclosed in U.S. Pat. No. 6,079,892.

FIG. 3 is a graph to explain a print media edge detection method disclosed in U.S. Pat. No. 6,079,892. With reference to FIG. 3, a detection voltage is obtained according to the amount of feeding print media. A standard voltage Vsa of a print medium A is obtained by multiplying a predetermined constant number C by a voltage difference between a maximum reflectance Vm1 of the print medium A and a voltage Vp detected on a platen, and another standard voltage Vsb of a print medium B is obtained by multiplying the predetermined constant number C by a voltage difference between a maximum reflectance Vm2 of the print medium B and the voltage Vp. Here, the constant number C is a value in proportion to the amount of light reflected from the print medium. When the print medium is not fed, C=0, and when all the light beam irradiated from a sensor is reflected since the print medium is perfectly fed, C=1. The C value is set to an appropriate value between 0 and 1, i.e., for example, 0.3.

In the print media edge detection method disclosed in U.S. Pat. No. 6,079,892, when margin printing on the print medium is performed, a real time voltage value can be obtained from the amount of reflected light by irradiating the light beam on the print media edge position using an optical sensor, and if a voltage value approaching the standard voltage Vsa or Vsb is obtained, feeding of the print medium is stopped, and printing is performed.

However, in the print media edge detection method disclosed in U.S. Pat. No. 6,079,892, since the C value is represented only with a value related to the reflectance, exact data about the C value is not given, and a variation range of the standard voltage Vsa or Vsb is wide, stability is low.

SUMMARY OF THE INVENTION

The present invention provides a print media edge detection method and apparatus capable of detecting a substantially exact edge position so as to effectively perform printing on the edge position.

According to an aspect of the present invention, a print media edge detection method comprises: generating reference data by scanning an edge zone of a sheet of print media using an optical sensor and detecting an amount of reflected light; if the edge zone of the sheet lies in a sensing zone of the optical sensor, calculating measuring data by scanning the edge zone and detecting the amount of reflected light; checking a voltage range of the edge zone from the measuring data, calculating a most frequently appearing voltage value within the voltage range, and setting the most frequently appearing voltage value as an edge position voltage value; and setting a position of the sheet corresponding to the edge position voltage value in the reference data as an edge position.

According to another aspect of the invention, the generating reference data comprises: measuring the amount of reflected light by scanning the edge zone using the optical sensor; converting the amount of reflected light to a voltage value by photoelectric conversion; and generating the reference data representing the voltage value according to a position of the edge zone.

According to another aspect of the invention, the generating reference data comprises scanning, performed by fixing the optical sensor and transporting the sheet of print medium, if the edge zone includes a top edge position or a bottom edge position.

According to another aspect of the invention, the generating reference data comprises scanning, performed by stopping the sheet of print medium and moving the optical sensor, if the edge zone includes a left edge position or a right edge position.

According to another aspect of the invention, the generating reference data comprises scanning performed by fixing the optical sensor and transporting the sheet of print medium, if the edge zone includes a top edge position or a bottom edge position.

According to another aspect of the invention, the calculating measuring data comprises: measuring the amount of reflected light by scanning the edge zone; converting the amount of reflected light into a voltage value by photoelectric conversion; and generating the reference data representing the voltage value according to a position of the edge zone.

According to another aspect of the invention, the calculating measuring data comprises scanning, performed by stopping the sheet of print medium and moving the optical sensor, if the edge zone includes a top edge position or a bottom edge position.

According to another aspect of the invention, the calculating measuring data comprises scanning, performed by fixing the optical sensor and moving the sheet of print medium, if the edge zone includes a left edge position or a right edge position.

According to another aspect of the invention, the calculating measuring data comprises scanning, performed by stopping the sheet of print medium and moving the optical sensor, if the edge zone includes a top edge position or a bottom edge position.

According to another aspect of the invention, the amount of light reflected from the sheet of print medium is greater than that reflected from a region except the sheet of print medium.

According to another aspect of the invention, a reflecting material is placed on the sensing zone of a bottom portion of the sheet.

According to another aspect of the present invention, a print media edge detection apparatus comprises: a roller controller which controls feeding rollers transporting a sheet of print media into a hard copy apparatus and discharging rollers discharging the sheet; a carrier controller which performs printing by controlling a carrier injecting ink on the sheet; an optical sensor controller which senses an edge zone of the sheet by controlling an optical sensor to scan the sheet; and a data calculator which generates reference data from the amount of light measured by scanning the edge zone using the optical sensor, calculates measuring data from the amount of light actually measured in the edge zone while printing, sets a most frequently appearing voltage value as an edge point voltage value, and obtains an edge position from the reference data.

According to another aspect of the invention, the data calculator generates the reference data representing a voltage value according to a position using an electric signal corresponding to the amount of light measured in the edge zone.

According to an aspect of the invention, the data calculator calculates the measuring data representing a voltage value according to a position of using the amount of light measured by scanning the edge zone by the optical sensor.

Additional and/or other aspects and advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing in detail exemplary embodiments thereof with reference to the attached drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention can be used more effectively for an ink-jet printer. A print media edge detection method and apparatus is used for performing marginless printing.

Figure 4:
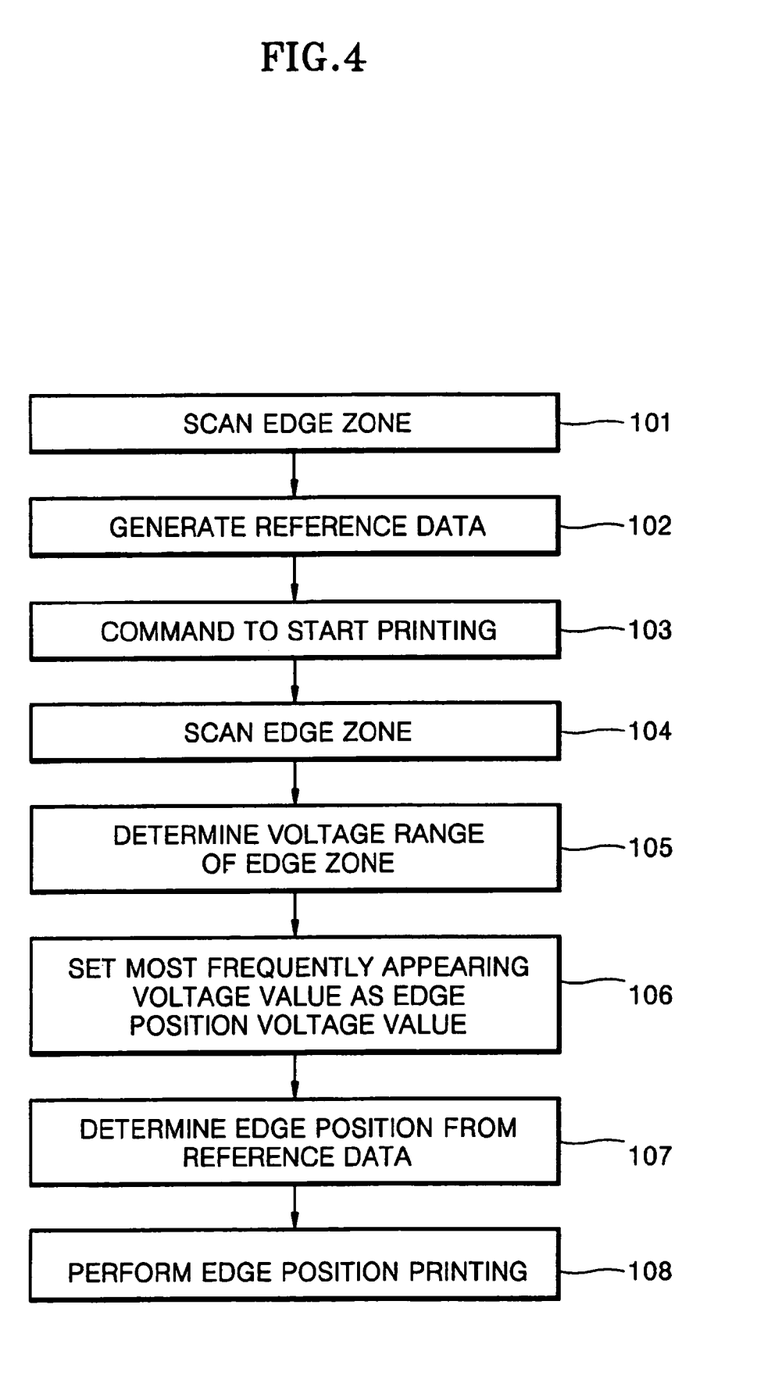
FIG. 4 is a flowchart of a print media edge detection method according to an exemplary embodiment of the present invention.
Figure 5:
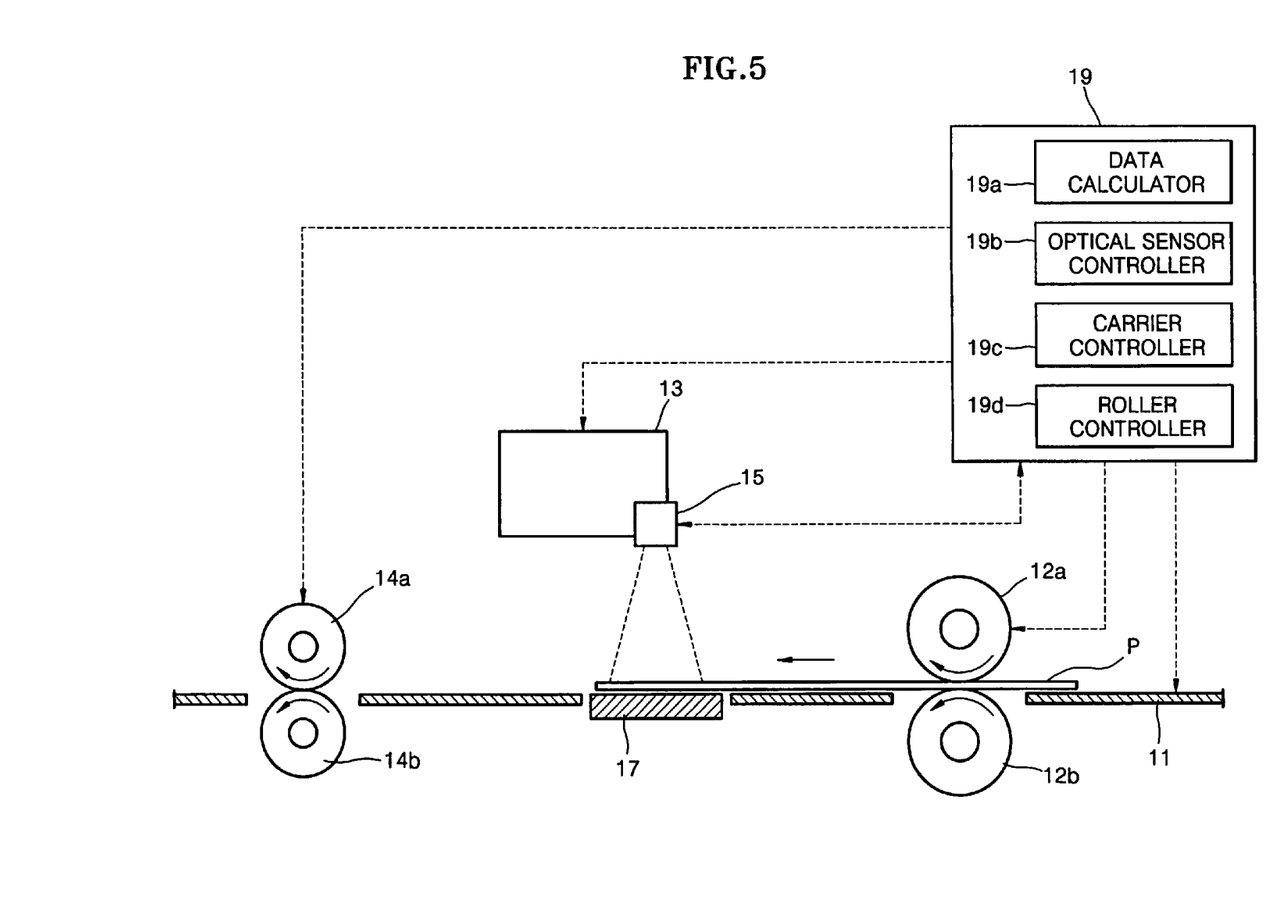
FIG. 5 is a schematic concept diagram of a print media edge detection apparatus according to an exemplary embodiment of the present invention.

FIG. 4 is a flowchart of a print media edge detection method according to an exemplary embodiment of the present invention. FIG. 5 is a schematic concept diagram of a print media edge detection apparatus according to an exemplary embodiment of the present invention. An edge position represents a top edge position, a bottom edge position, a left edge position, or a right edge position. An edge zone represents a circumference zone including the edge position and having a predetermined width to the inside of a sheet of print media from the edge position.

With reference to FIG. 4, the method is largely divided into a procedure to generate reference data and a procedure to obtain actual measuring data and determining the edge position using the reference data.

The procedure to generate reference data includes scanning the edge zone using an optical sensor 101 and generating the reference data by photoelectrically converting a light beam detected by the optical sensor and calculating a voltage value through the photoelectric conversion 102. The optical sensor includes a light source such as a light emitting diode (LED), an optical detector to receive the light beam, reflected from a print medium and to convert the light beam into a photoelectric signal, and a series of optical lenses located on a light-path between the light source and the optical detector.

The method illustrated in FIG. 4 is executed using the apparatus illustrated in FIG. 5. With reference to FIG. 5, a hard copy apparatus includes a platen 11, feeding rollers 12a and 12b which are fixed to the platen 11 and which transport a sheet of print media P to a printing zone, discharging rollers 14a and 14b which discharge the printed sheet P out of the hard copy apparatus, a carrier 13 which loads an ink cartridge and performs printing by injecting ink on the sheet P, and an optical sensor 15 which is installed on the carrier 13, irradiates the light beam on the sheet P, receives the reflected light, and performs the photoelectric conversion. A reflecting material, i.e., a light well to absorb black material, is located all over the sensing zone.

The hard copy apparatus also includes the print media edge detection apparatus 19. The detection apparatus 19 includes a data calculator 19a which calculates required data using a signal received from the optical sensor 15, an optical sensor controller 19b which outputs a signal controlling the optical sensor 15, a carrier controller 19c which outputs a signal to drive the carrier 13, and a roller controller 19d which outputs signals to control the feeding rollers 12a and 12b and the discharging rollers 14a and 14b.

The roller controller 19d drives the feeding rollers 12a and 12b and transports the sheet P into the printing zone. When the sheet P is transported to the printing zone under the carrier 13, the optical sensor controller 19b calculates a transporting distance of the sheet P from an electric signal output from the roller controller 19d, and if the optical sensor controller 19b determines that an edge position of the sheet P is transported under the optical sensor 15, the optical sensor controller 19b irradiates a light beam on the sheet. The optical sensor 15 is installed in the carrier 13 and detects predetermined information by irradiating the light beam on the sheet P before printing by the carrier 13 is performed.

If the edge position of the sheet P to be detected is a top edge position or a bottom edge position, the optical sensor 15 scans a top edge zone or a bottom edge zone of the sheet P while the optical sensor 15 is fixed and the sheet P is transported in the feeding direction. While the top edge zone of the sheet P is transported in the feeding direction, the amount of reflected light detected by the optical sensor 15 gradually increases according to an increase of a proportion of the sheet P transported into the printing zone. On the contrary, while the bottom edge zone of the sheet P is transported in the feeding direction, the amount of reflected light detected by the optical sensor 15 gradually decreases according to a decrease of a proportion of the sheet P remaining in the printing zone.

If the edge position of the sheet P to be detected is a left edge position or a right edge position, the optical sensor 15 scans a left edge zone or a right edge zone of the sheet P while transporting of the sheet P is stopped and the optical sensor 15 is moved in the carrier moving direction which is vertical to the feeding direction. If the optical sensor 15 is moved from the left to the right when the left edge zone of the sheet P is scanned, the amount of light detected by the optical sensor 15 gradually increases. On the contrary, if the optical sensor 15 is moved from the left to the right when the right edge zone of the sheet P is scanned, the amount of reflected light detected by the optical sensor 15 gradually decreases.

The optical sensor controller 19b sets the edge zone of the sheet P with a predetermined length transported from the edge position of the sheet P using length information of the sheet P and commands the optical sensor 15 to irradiate the light beam on the edge zone and scan the edge zone. The optical sensor 15 receives light beams corresponding to the different amounts of light reflected from the edge zone and a region except the edge zone while scanning the edge zone of the sheet P. Since the amount of light reflected from the sheet P is greater than that reflected from the reflecting material 17, the reference data can be generated by calculating a voltage value in proportion to the amount of reflected light.

Figure 6:
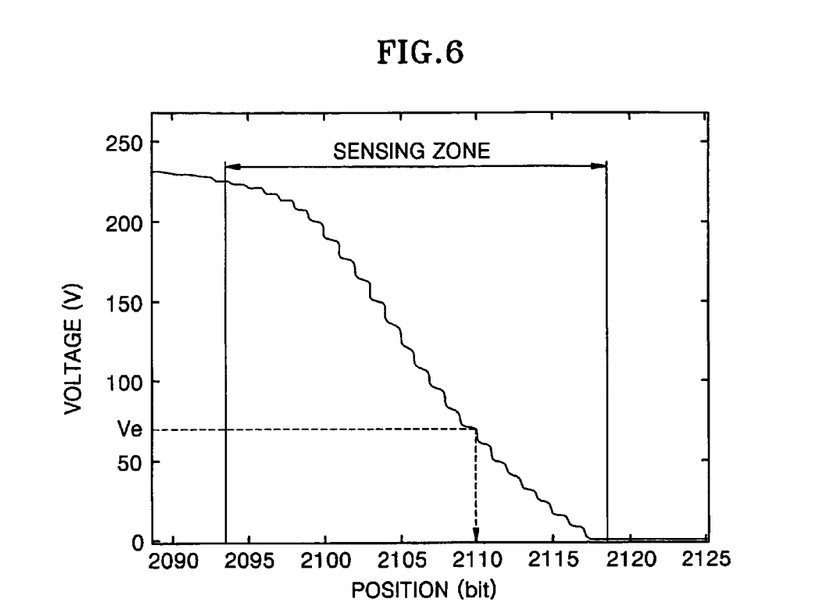
FIG. 6 is a graph to explain reference data of FIG. 4.

FIG. 6 is a graph to explain the reference data.

With reference to FIG. 6, the reference data may be represented as a relationship of a voltage value versus a position (bit). The X-axis of the graph represents the position (bit) of the sheet P, wherein 600 bits represent 1 inch. The position (bit) is set to a range from 2090 bits to 2125 bits, and a voltage value represented within the range has a range of 0 to 240V (*$5/256$V) (1 unit=$5/256$V). The graph illustrates variation of the amount of reflected light appearing when the bottom edge position passes under the optical sensor 15. The amount of reflected light gradually decreases when the bottom edge position passes under the optical sensor 15.

When information, which details that the bottom edge zone of the sheet P starts from 2093 bits is input to the optical sensor controller 19b and the sheet P is transported with a predetermined distance according to revolution of the feeding rollers 12a and 12b, the optical sensor controller 19b outputs a signal to drive the optical sensor 15. Since the length of the edge zone set according to the length of the print media P is stored in the optical sensor controller 19b in advance, the optical sensor controller 19b outputs a driving signal to irradiate the light beam during a predetermined period of time according to the sheet P to the optical sensor 15. The length of the edge zone is set to 25 bits from 2093 bits to 2118 bits in the graph of FIG. 6, and the edge zone corresponds to a sensing zone.

When the bottom edge position of the sheet P passes under the optical sensor 15, the voltage value sensed in the sensing zone gradually decreases and drops to 0 at a 2118-bit position. The graph representing the voltage values according to the positions in the edge zone is stored as the reference data.

Next, if a print start command is input in operation 103, the roller controller 19d drives the feeding rollers 12a and 12b by outputting the signal to drive the feeding rollers 12a and 12b and transports the sheet P into the hard copy apparatus. If the sheet P is transported with a predetermined distance until a predetermined edge zone is located under the optical sensor 15, sensing of the edge zone starts in operation 104.

If the edge zone to be detected is a top edge zone or a bottom edge zone, the roller controller 19d stops transporting the sheet P and drives the optical sensor 15. This driving operation is opposite to a driving operation to fix the optical sensor 15 and to transport the sheet P to generate the reference data.

If the edge zone to be detected is a left edge zone or a right edge zone, the roller controller 19d fixes the optical sensor 15 and transports the sheet P. This driving operation is also opposite to a driving operation to stop the transporting operation of the sheet P and the driving operation of the optical sensor 15 to generate the reference data.

The amount of light received in the optical sensor 15 varies within a predetermined range due to tilt of the sheet P or uneven driving of the carrier 13 loading the optical sensor 15. The range of the voltage value detected by the optical sensor 15 is determined in operation 105, and a most frequently appearing voltage value is set as an edge position voltage value Ve in operation 106.

Figure 7:
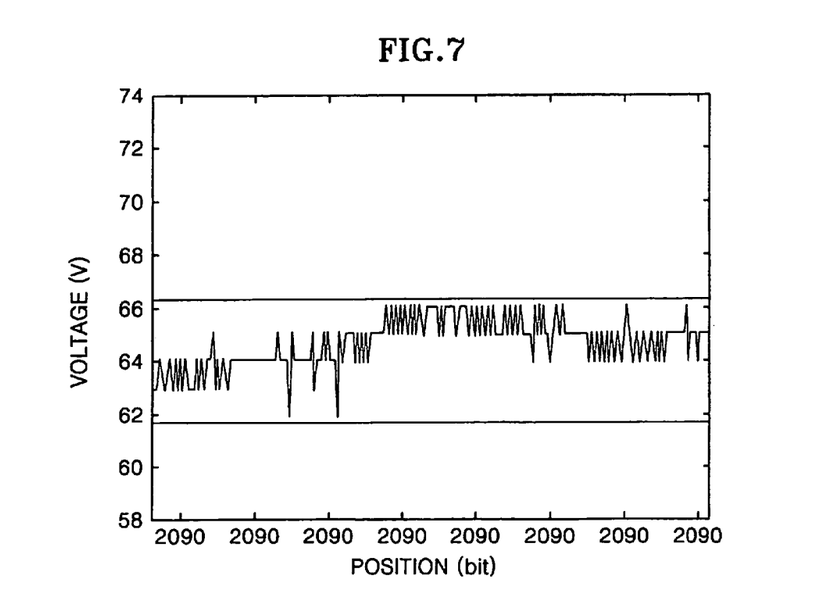
FIG. 7 is a graph to explain measuring data of FIG. 4.

FIG. 7 is a graph illustrating the amount of light measured after the edge zone is scanned in operation 104, corresponding to voltage values according to carrier positions. With reference to FIG. 7, the voltage value of the edge zone is between 61.8V and 66.2V according to the position of the sheet P.

Figure 8:
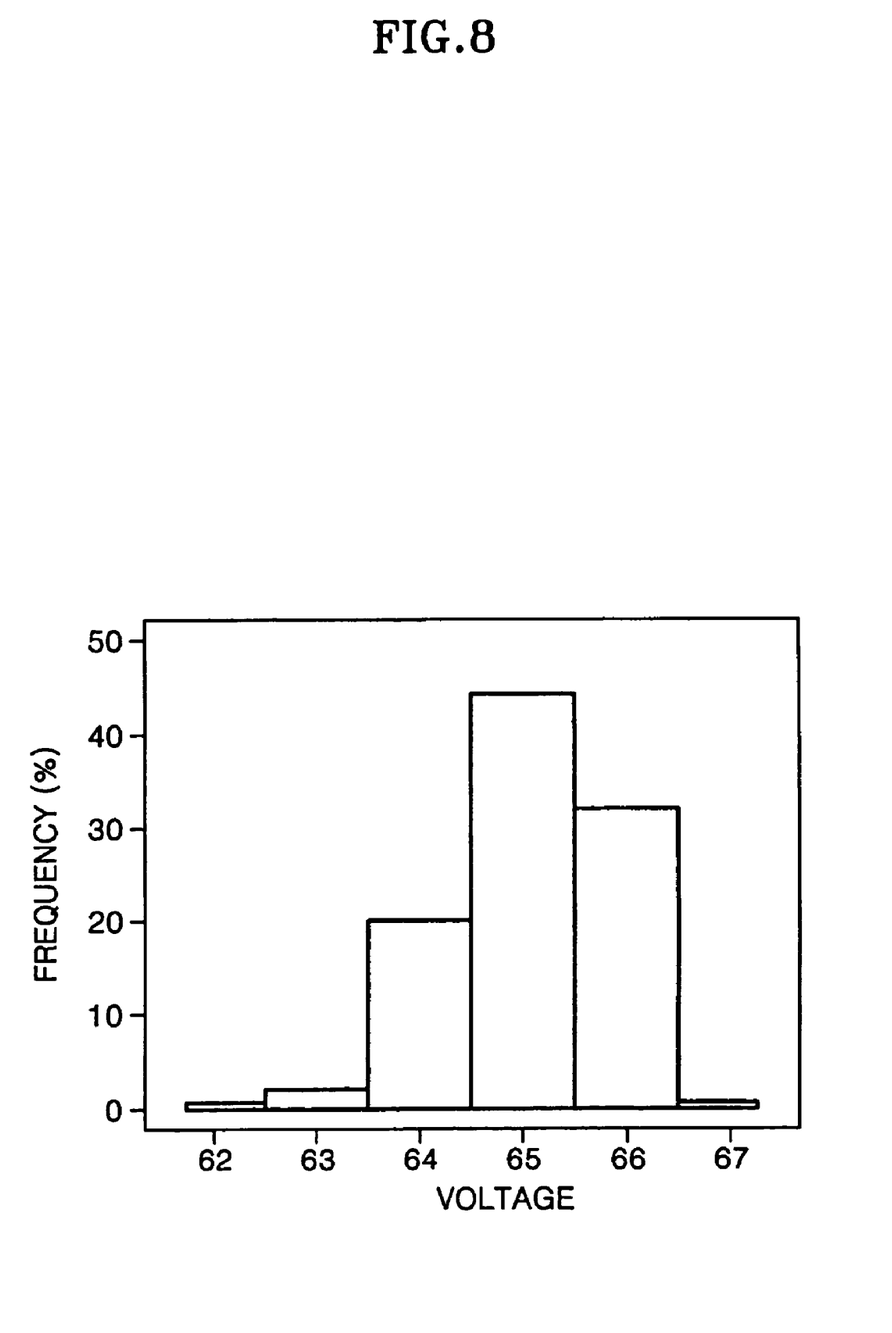
FIG. 8 is a graph of voltage value appearing probabilities in percentage values obtained using the graph values of FIG. 7 to find out a most frequently appearing voltage value.

FIG. 8 is a graph representing voltage value appearing probabilities in percentage values using the graph values of FIG. 7 to find out the most frequently appearing voltage value Ve in operation 106. With reference to FIG. 8, a voltage value 65V (*5/256V) appears with an over 40% frequency within the voltage range of the edge zone between 61.8V and 66.2V. Therefore, the voltage value 65V (*5/256V) may be set as the most frequently appearing voltage value Ve.

When the edge position voltage value is set in operation 106, a position of the sheet P corresponding to the most frequently appearing voltage value Ve in the reference data is determined as the edge position in operation 107 such as that which is illustrated in FIG. 4 a printing operation is then performed on the edge position in operation 108. Since the edge position voltage value Ve may be set to 65V (*5/256V) in FIG. 7, when a position of the sheet P corresponding to 65V (*5/256V) is determined in FIG. 6, 2110 bits may be set as a value of the bottom edge position. That is, the edge position of the sheet P is located at a position 7 bits apart from a position of 2117 bits, the position before the sheet P is discharged.

As is described above, since occurrence of errors may be decreased using a print media edge detection method and apparatus according to the present invention when printing of an edge position is performed, marginless edge position printing is efficiently performed. Also, the method and apparatus can be efficiently used to perform printing with a minute margin.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A print media edge detection method comprising:
    generating reference data by scanning an edge zone of a sheet of print media using an optical sensor and detecting an amount of reflected light;
    if the edge zone of the sheet lies in a sensing zone of the optical sensor, calculating measuring data by scanning the edge zone and detecting the amount of reflected light;
    checking a voltage range of the edge zone from the measuring data, calculating a most frequently appearing voltage value within the voltage range, and setting the most frequently appearing voltage value as an edge position voltage value; and
    setting a position of the sheet corresponding to the edge position voltage value in the reference data as an edge position.

2. The method of claim 1, wherein the generating reference data comprises:
    measuring the amount of reflected light by scanning the edge zone using the optical sensor;
    converting the amount of reflected light into a voltage value by photoelectric conversion; and
    generating the reference data representing the voltage value according to a position of the edge zone.

3. The method of claim 2, further comprising performing scanning by fixing the optical sensor and transporting the sheet of print medium, if the edge zone includes a top edge position or a bottom edge position.

4. The method of claim 2, further comprising performing scanning by stopping the sheet of print medium and moving the optical sensor, if the edge zone includes a left edge position or a right edge position.

5. The method of claim 1, wherein the calculating measuring data comprises:
    measuring the amount of reflected light by scanning the edge zone;
    converting the amount of reflected light into a voltage value by photoelectric conversion; and
    generating the reference data representing the voltage value according to a position of the edge zone.

6. The method of claim 5, further comprising performing scanning by stopping the sheet of print medium and moving the optical sensor, if the edge zone includes a top edge position or a bottom edge position.

7. The method of claim 5, further comprising performing scanning by fixing the optical sensor and moving the sheet of print medium, if the edge zone includes a left edge position or a right edge position.

8. The method of claim 1, further comprising reflecting an amount of light from the sheet of print medium which is greater than that reflected from a region except the sheet of print medium.

9. The method of claim 1, further comprising placing a reflecting material on the sensing zone of a bottom portion of the sheet to absorb black material.

10. A print media edge detection apparatus comprising:
    a roller controller which controls feeding rollers to transport a sheet of print media to a hard copy apparatus and discharging rollers to discharge the sheet;
    a carrier controller to control a carrier injecting ink on the sheet to print;
    an optical sensor controller to control an optical sensor to scan the sheet to sense an edge zone of the sheet; and
    a data calculator which generates reference data from the amount of light measured by scanning the edge zone using the optical sensor, calculates measuring data from the amount of light actually measured in the edge zone while printing, sets a most frequently appearing voltage value as an edge point voltage value, and obtains an edge position from the reference data.

11. The apparatus of claim 10, wherein the data calculator generates the reference data representing a voltage value according to a position of the sheet of print media using an electric signal corresponding to the amount of light measured in the edge zone.

12. The apparatus of claim 10, wherein the data calculator calculates the measuring data representing a voltage value according to a position of the sheet of print media using the amount of light measured by scanning the edge zone by the optical sensor.

13. A print media edge detection apparatus comprising:
    a roller controller to transport a sheet of print media to a hard copy apparatus and to discharge the sheet;
    a carrier controller to control a carrier to inject ink on the sheet;
    an optical sensor controller to sense an edge zone of the sheet; and
    a data calculator which generates reference data from the amount of light measured by scanning the edge zone using the optical sensor, calculates measuring data from the amount of light actually measured in the edge zone while printing, sets a most frequently appearing voltage value as an edge point voltage value, and obtains an edge position from the reference data.

14. The apparatus according to claim 13, further comprising feeding rollers to transport the sheet, wherein the roller controller controls the feeding rollers.

15. The apparatus according to claim 13, further comprising discharging roller to discharge the sheet, wherein the roller controller controls the discharging rollers.

16. The apparatus according to claim 13, further comprising an optical sensor to sense the edge zone of the sheet, wherein the optical sensor controller controls the optical sensor.

* * * * *

UNITED STATES PATENT AND TRADEMARK OFFICE
CERTIFICATE OF CORRECTION

| | |
|---|---|
| PATENT NO. | : 6,966,713 B2 |
| APPLICATION NO. | : 10/891284 |
| DATED | : November 22, 2005 |
| INVENTOR(S) | : Tae-young Kim |

It is certified that error appears in the above-identified patent and that said Letters Patent is hereby corrected as shown below:

On the Title Page: Column 2, line 3, (Foreign Patent Documents),
 "J P    0-382-502    8/1990"
Should read;   --EP    0-382-502    8/1990--.

Signed and Sealed this

Twenty-ninth Day of August, 2006

JON W. DUDAS
*Director of the United States Patent and Trademark Office*